G. I. ROCKWOOD.
FUSIBLE LINK.
APPLICATION FILED AUG. 14, 1911.
1,084,710.
Patented Jan. 20, 1914.
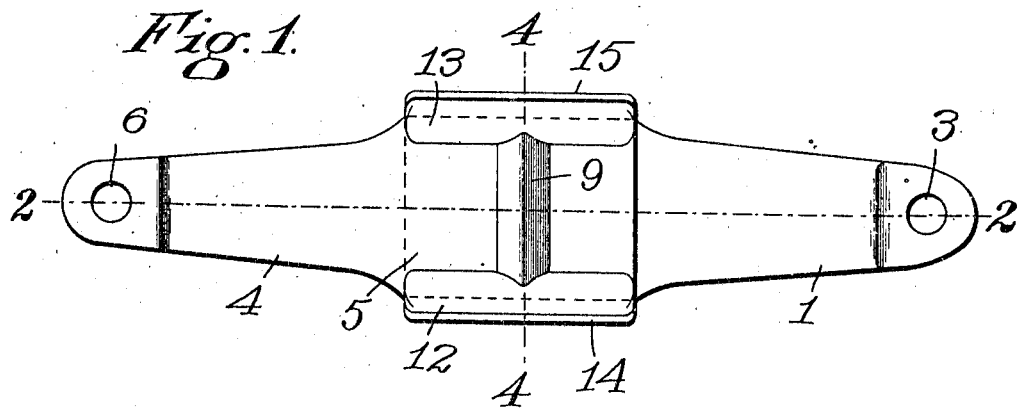
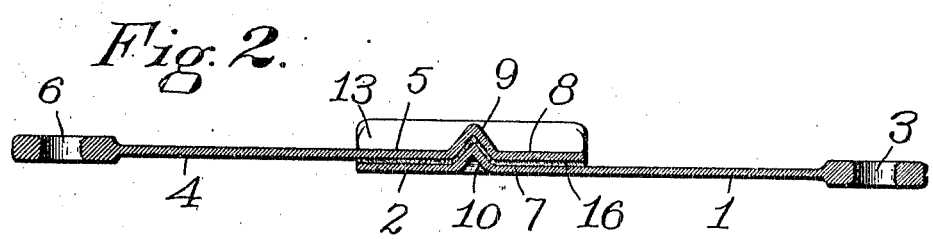
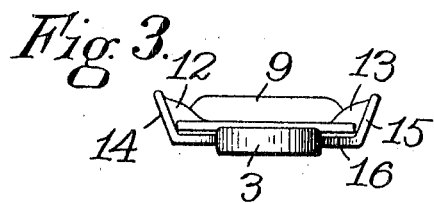 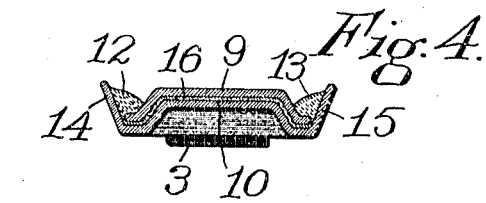
Witnesses.
R. D. Tolman
Penelope Cumberbach
Inventor
George I. Rockwood.
By Rufus B. Fowler
Attorney

UNITED STATES PATENT OFFICE.

GEORGE I. ROCKWOOD, OF WORCESTER, MASSACHUSETTS.

FUSIBLE LINK.

1,084,710.   Specification of Letters Patent.   Patented Jan. 20, 1914.

Application filed August 14, 1911. Serial No. 643,883.

*To all whom it may concern:*

Be it known that I, GEORGE I. ROCKWOOD, a citizen of the United States, residing at Worcester, in the county of Worcester and Commonwealth of Massachusetts, have invented a new and useful Improvement in Fusible Links, of which the following is a specification.

My invention relates to fusible links arranged to form part of a tensile support and to remain unbroken except in case of fire. The tensile support of which the link forms a part may be employed in holding open fire proof doors or shutters between the different rooms of stores or warehouses, or for similar purposes, where a door or shutter is designed to remain open except in case of fire. The fusible link is arranged to yield at a predetermined degree of heat by the melting of the fusible material forming part of the link and to allow the door or shutter to close.

The purpose and character of the fusible link shown at present is similar to that shown in the Letters Patent No. 911,162, issued to me February 2, 1909; and the objects of the present improvement are to construct a link composed of separate members fashioned by fusible solder, with a portion of the contacting surfaces of said members arranged at an angle to the line of tensile strain, so that the members in separating under the tensile strain when the solder is melted will separate upon a line at an angle to said tensile strain; to apply the attaching solder in such manner that the members in separating will exert a shearing cut upon it on a line transverse to the line of tensile strain by surfaces at right angles to each other. This brings the force of the tensile strain upon the solder against the line of adhesive force, so that the members will not separate under the tensile strain until the solder is sufficiently softened.

In my improved link I provide abutting surfaces at an acute angle to the line of tensile strain, and I hold these surfaces in contact by solder applied to the members at a different location than at the position of the abutting surfaces. Where the solder is applied, the surfaces of the separate members are approximately at right angles to each other, and a separation of the members under the tensile strain is at a line parallel with the surface on one member to which the solder is applied and approximately at right angles to the similar surface on the other.

I attain these objects by the mechanism illustrated in the accompanying drawings, in which—

Figure 1 is a plan view of my improved link. Fig. 2 is a central longitudinal section. Fig. 3 is an end view. Fig. 4 is a transverse central section.

Similar reference characters refer to similar parts in the different figures.

In the drawings, 1 denotes one member of a fusible link, formed from a plate 2, having at the outer end an eye 3 to which a cable may be attached. The other member 4 is also formed from a similar plate 5 with an eye 6. At the ends of the plates 2 and 5 opposite to the eyes 3 and 6 the opposing surfaces 7 and 8 are arranged, which, in the present instance, comprise on the plates 2 and 5 transverse inward V-shaped bends at an acute angle to the line of longitudinal tensile strain exerted upon the plates 2 and 5 by the cables which may be inserted in the eyes 3 and 6. These transverse V-shaped bends, as shown in Figs. 3 and 4, do not extend to the edges of the opposing surfaces which are arranged upon the planes of the remainder of the plates. The transverse V-shaped bend 10 in the plate 2 is matched by a similar bend 9 in the plate 5, which is designed to rest upon the upper side of the plate 2. As long as these V-shaped bends 9 and 10 are in engagement any longitudinal strain applied to the plates 2 and 5 will have the effect of separating directly the opposing surfaces 7 and 8, and this direct separation will continue until the V-shaped bends are sufficiently far apart for the bend 9 to slip by the bend 10, causing a separation of the members of the link. In the present case this direct separation between the plates 2 and 5 is prevented by rows 12 and 13 of fusible solder placed upon the edges of the upper surface of the plate 5 beyond the ends of the bend 9. These rows of solder extend inward on the plate 5 only a short distance and leave without a covering of solder the V-shaped bend 9. The edges of the plate 2 are turned upwardly forming flanges 14 and 15 preferably at an oblique angle to the plate 2. The rows 12 and 13 of solder contact with and are soldered to the edges of the plate 5 and the turned up flanges 14 and 15 of the plate 2. The opposing surfaces 7 and 8 of the plates 2 and 5 are also preferably united by a slight covering 16 of solder.

Any tensile strain exerted upon the members 1 and 4 will be resisted by the interlocking of the V-shaped bends 9 and 10 until the fusible material 12, 13 and 16 is softened by the required degree of heat. When this fusible material has become softened, the force of the tensile strain tends to separate the plates 2 and 5 directly, which direct separation has previously been resisted by the adhesive force of the solder. The upturned flanges 14 and 15 upon the edges of the plate 2 extend a short distance upon each side of the transverse bend forming, where they pass the bend 10, a trough or depression into which the downwardly turned plate 5 extends with its edges, as shown in Fig. 4, parallel with the plate 2. A portion of the solder 12 and 13 occupies the V-shaped space between the oblique upturned flanges 14 and 15 and the downwardly turned portion of the plate 5 and extends over the edges of the plate 5. As the solder 12 and 13 is softened by heat, the flat edges of the plate 5 underlying the solder will be lifted by the movement of the bends 9 and 10 relatively to each other, causing a displacement of the solder. The movement apart of the plates 2 and 5 tends to overcome the adhesion of the solder in the rows 12 and 13 by a shearing action, the lifting of the plate 5 shearing the mass of solder resting thereon, from the mass of solder attached to the flanges 14 and 15. When the device is subjected to the action of heat the upper surface of plate 5 and the under surface of plate 2 are fully exposed, as well as the outer surfaces of the rows 12 and 13 of solder, and the release of the plates 2 and 5 is accomplished when the solder in the rows 12 and 13 is sufficiently softened to yield to the shearing strain exerted by the separating movement of the plates 2 and 5.

I have found by experiment that the predetermined degree of heat is more accurately measured by the resistance of a fusible metal to a shearing strain than by its direct adhesion. My present invention is designed to construct a fusible link adapted to be released by a shearing strain rather than by the resistance of a fusible metal to compression, as in the link forming the subject of my Patent No. 911,162, or by the direct adhesive force of a fusible metal.

I am aware that interlocking plates held together by a fusible material have been employed in the construction of so called fusible links and I do not claim such broadly.

By my present invention, I am able to employ a retaining mass of solder, arranged to be sheared apart, and I apply the solder directly to prevent the lifting of the plate 5 by the movement of the oblique surfaces of the transverse bends 9 and 10 over each other. A small resisting force exerted by the rows of solder 12 and 13 is enabled to withstand a powerful longitudinal strain upon the plates 2 and 5.

I claim,

1. A fusible link adapted to receive a tensile strain, comprising two members, one of said members having side flanges extending beyond the edges of the other member, said members having opposing surfaces oblique to the line of tensile strain, and means for holding said oblique surfaces in engagement, said means comprising a material fusible at a predetermined degree of heat, said material being attached to said side flanges and to the adjacent edges of the other member.

2. A fusible link comprising two members adapted to receive a tensile strain and having opposing surfaces oblique to the line of tensile strain, one member having free edges turned at an oblique angle to form diverging side flanges extending beyond the edges of the other member, and fusible material arranged to contact with the inner surfaces of said flanges and the adjacent edges of the other member.

3. A fusible link comprising two plates adapted to receive a tensile strain and having opposing surfaces oblique to the line of tensile strain, one plate having free edges bent across and beyond the plane of the other plate, and fusible material connecting the exposed surfaces of the edges of the latter plate and said bent edges.

4. A fusible link comprising two plates having engaging transverse V-shaped bends extending partially across the plates, with one of said plates provided with oblique flanges extending beyond the edges of the other plate, and fusible material attached to the inner sides of said flanges and to the outer surface of the other plate.

GEORGE I. ROCKWOOD.

Witnesses:
PENELOPE COMBERBACH,
NELLIE WHALEN.